United States Patent

Gibson

[15] 3,667,050

[45] May 30, 1972

[54] COARSE CARRIER PHASE CORRECTION SYSTEM

[72] Inventor: Earl D. Gibson, Huntington Beach, Calif.

[73] Assignee: North American Rockwell Corporation

[22] Filed: Nov. 27, 1970

[21] Appl. No.: 97,422

[52] U.S. Cl. ................................325/323, 178/88, 325/420

[51] Int. Cl. ..........................................................H04b 1/26

[58] Field of Search ......................325/30, 38 R, 60, 63, 320, 325/321, 418, 422, 423, 155; 178/66, 67, 88

[56] References Cited

UNITED STATES PATENTS

| | | | |
|---|---|---|---|
| 3,605,017 | 9/1971 | Chertok | 325/30 |
| 3,311,442 | 3/1967 | De Jager et al. | 325/63 X |
| 3,443,229 | 5/1969 | Becker | 325/60 |

*Primary Examiner*—Benedict V. Safourek
*Attorney*—L. Lee Humphries, H. Fredrick Hamann and Edward Dugas

[57] ABSTRACT

In the present invention a first and second demodulating means each demodulate the received signal against a reference carrier. The same reference carrier is used for both demodulating means with the exception that the carrier which enters the second demodulating means is shifted in phase by a small fixed amount. The two demodulated signals are then fed to independent zero-crossing detector means, which detector means provide output signals proportional to the phase difference between the reference carrier signal used with each of the associated demodulators and the desired (correct) carrier signal.

A difference means senses the output signals from each of the zero-crossing detectors to provide an error signal proportional to the phase difference between the two output signals. The error signal is then utilized by a phase modulator to control the phase of the reference carrier signal which is fed to the first and second demodulators to minimize the phase difference between the reference carrier and the desired carrier signal.

8 Claims, 6 Drawing Figures

INVENTOR
EARL D. GIBSON
BY
Edward Dugas
ATTORNEY

INVENTOR
EARL D. GIBSON
BY Edward Dugas
ATTORNEY

INVENTOR
EARL D. GIBSON
BY Edward Dugas
ATTORNEY

COARSE CARRIER PHASE CORRECTION SYSTEM

BACKGROUND OF THE INVENTION

In a high speed synchronous data transmission receiver, initially the data receiver has no knowledge of the correct carrier phase, sample timing, or equalization. A major problem in the receiver design, therefore, is to devise a means whereby the receiver can start learning one of these essential parameters without depending upon knowledge of the other parameters. For example, in a single-sideband receiver, the phase-locked-loop can track the frequency translation and slow phase jitter but provides no knowledge of the steady carrier phase offset, which offset severely distorts the received signal. For these reasons, a coarse carrier phase offset correction device, capable of performing with complete independence of the sample timing and equalization, is needed.

In the past, various techniques utilizing phase-lock-loops have been used to recover or detect the phase of the transmitting carrier or baud rate of a received signal. Heretofore, such systems have required the transmission of some type of signal, in addition to the information signals, to indicate the phase of the transmitted carrier. Some prior art systems have used pilot tones which are added to the transmitted signal and which are detected in the receiver to provide signals which, in turn, are used to control the demodulators and/or samplers contained in the receiver. As the data rate is increased, the signal spectrum is forced closer to the edges of the channel bandwidth, where the delay distortion is usually severe. Since the pilot tones must then be transmitted near the channel band edge, they are displaced in phase by large amounts relative to the correct phase. Conventional devices, such as phase-lock-loops, cannot determine these steady phase offsets. For those systems which utilize a pilot tone, the signal energy available for information is decreased due to the allocation of a portion of this energy to the pilot tone generation. On those channels that do not introduce exceptionally large frequency translation or phase jitter, the present invention makes it possible for the receiver to recover a carrier of correct frequency and sufficiently accurate phase without transmitting any tone or other signal specifically for this purpose. Then, the carrier reference input to the phase corrector of this invention can be obtained from a stable clock and frequency divider chain. Tiny frequency errors in the stable clock will be corrected by the device of this invention in the process of correcting the carrier phase. On such channels no signal other than the regular data signal need be transmitted. In some applications, it will be necessary to transmit a reference tone while using this invention. In such applications, a conventional phase-lock-loop first extracts the received reference tone. Then, this invention is used to correct the phase offset of the tone obtained from the phase-lock-loop.

SUMMARY OF THE INVENTION

The present invention relates generally to timing recovery devices and more particularly to a coarse initial timing recovery device for use in a high speed synchronous data transmission receiver.

In the preferred embodiment of the invention, there is a first and second demodulating means for demodulating the received signal against two reference carriers, separated in phase by a fixed amount, the output of the correction system being taken from the output of the first demodulator means. A first and second zero-crossing detector means receives the demodulated signals from the first and second demodulator means, respectively, and provides output signals indicative of the zero-crossings of the two demodulated signals. Rate means are provided for limiting the provided output signals from the zero-crossing detector means to signals obtained when the received signal passes through zero at a rate of crossing greater than a preselected value. First and second narrowband filters are provided to obtain signals with levels indicative of the error in the carrier phase used for the first and second demodulating means, respectively. A difference means receives the signals from the first and second narrowband filters and provides an error signal which is proportional to the difference in level between the narrow-band filter output signals. A reference carrier signal source provides the carrier signal to the first demodulating means; and, this same carrier signal shifted in phase by a fixed amount is fed to the second demodulating means. A phase modulator receives the carrier signal and modulates the phase by an amount proportional to the error signal. The phase modulated carrier signal is then fed to the first demodulating means as its reference signal. A phase offset means receives as an input the modulated reference carrier phase signal and offsets the phase of the signal by a fixed amount before sending the offset signal to the second demodulator as its reference signal. The reference carrier signals fed to the first and second demodulator means are thereby adjusted to approximately the optimum phase and frequency for demodulating the received data signal.

It is, therefore, an object of the present invention to provide a coarse carrier phase offset correction system.

Accordingly, it is another object of the present invention to provide a carrier recovery device utilizing rate sensing means to selectively detect which zero-crossings of a received signal are to be used as a timing reference.

It is another object of the present invention to provide a carrier recovery device which is stable and reliable in its operation.

These and additional objects of the present invention will become more apparent when taken in conjunction with the following description and drawings in which drawings like characters indicate like parts.

BRIEF DESCRIPTION OF THE DRAWINGS

FIGS. *1a* and *1b* illustrate typical "eye" waveform patterns useful in understanding the operation of the present invention.

DESCRIPTION OF THE PREFERRED EMBODIMENT

Figure 2:
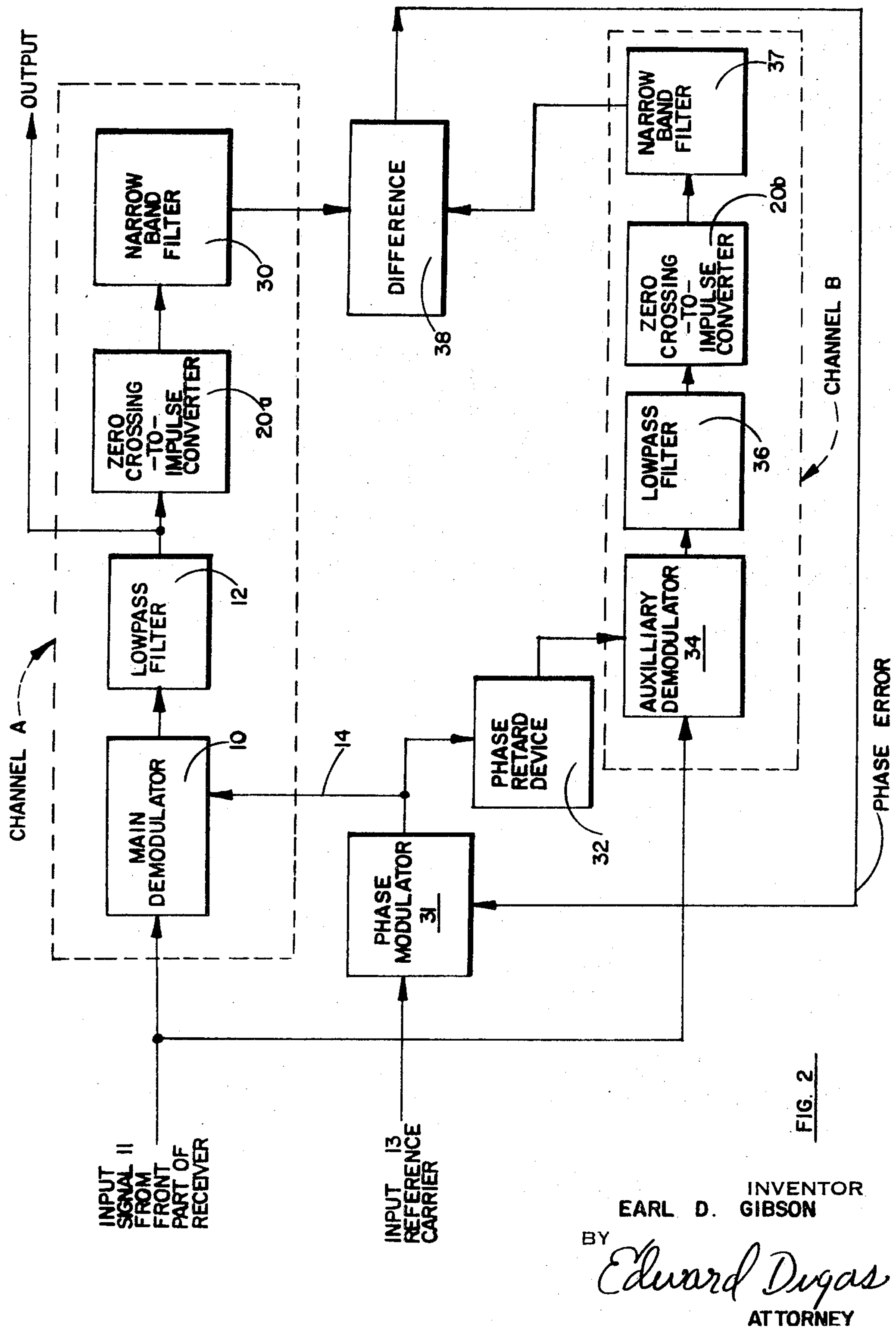
FIG. 2 is a circuit block diagram of the preferred embodiment of the preferred invention.

Referring to FIG. 2, the received signal 11 used with the present invention is of the type, for example, received by the demodulator in U.S. Pat. application, Ser. No. 10,332, entitled "High Speed Digital Trans-mission System", by E. D. Gibson, filed Feb. 11, 1970. In that application, the input signal to the demodulator is taken from bandpass filter 42 in FIG. 6 and is distorted in form due to the overall characteristics of the transmission and the receiving channel. The present system is based upon the time intervals between the instants at which the received demodulated signal passes through zero. As the carrier phase improves, these time intervals become more nearly equal to integral multiples of the baud duration.

FIG. *1a* shows an "eye" pattern with a close clustering of the zero-crossing time spacing around integral multiples of the baud duration which close clustering occurs when the carrier phase is correct and FIG. *1b* shows a typical dispersion of the time intervals between the zero crossings when, for example, the carrier phase error is approximately 30°.

Figure 3:
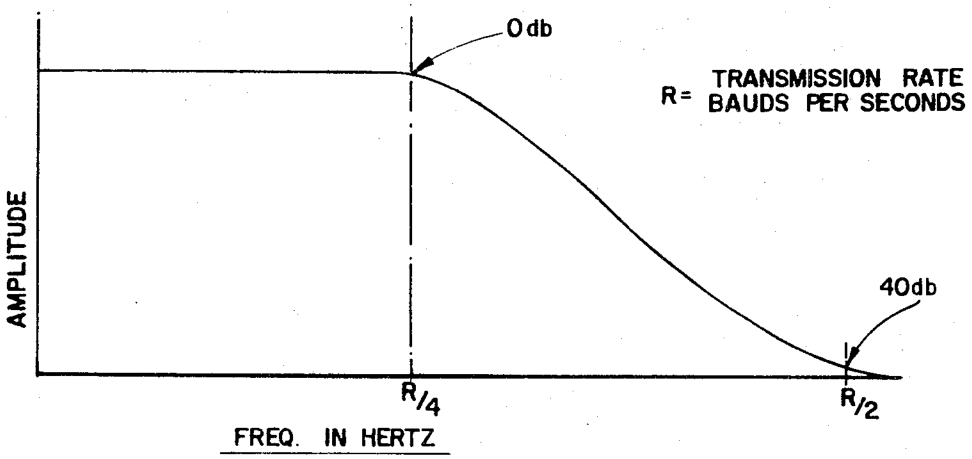
FIG. 3 illustrates the desired amplitude-frequency response of one of the components of the system of FIG. 2.

Referring again to the system block diagram on FIG. 2, signal channel A and signal channel B are identical in circuit construction. The input signal 11 from the forward portion of the receiver is fed directly to the main demodulator 10 which also receives reference carrier signal 14 from the phase modulator 31. The received signal 11 is demodulated against this reference carrier signal with the demodulated output being fed to lowpass filter 12. The lowpass filter 12 has a frequency characteristic which is shown in FIG. 3 and is designed to eliminate the upper sideband of the demodulator output and also to supplement the shaping of the demodulated signal. The output to lowpass filter 12 is the system output and is also the input to the zero-crossing-to-impulse converter **20*a*. The zero-crossing detector operates to provide an impulse each time the output from the lowpass filter passes through zero with the desired rate. The output from the zero-crossing detector 20*a* then is fed to a narrowband filter 30. The bandwidth of filter 30 is approximately one-hundredth of the baud transmission rate. The output from filter 30 is fed to a difference circuit 38. The phase modulator 31 receives as an input reference carrier signal 13 which carrier signal can be obtained from a stable clock and frequency divider chain (not shown) which operates to divide the frequency of the clock down to the baud transmission frequency. The phase modulator 31 also receives a phase error signal which error signal is the output from the difference circuit 38. The phase error signal from the difference circuit drives the phase modulator 31 to shift the phase of the reference carrier signal 13 toward the point where the phase of the reference carrier signal 14 entering the main demodulator 10 approaches the correct phase for demodulating the received signal 11. The phase modulated signal 14 is also fed to a phase retard device 32. The phase retard device 32 attaches a small fixed amount of phase offset approximately 10° to the received signal from modulator 31. The output from device 32 is fed to an auxiliary demodulator 34. Auxiliary demodulator 34 also receives as an input the received signal 11. The output from the auxiliary demodulator is fed to a lowpass filter 36 having the identical frequency characteristics as lowpass filter 12. The output from lowpass filter 36 is fed to a zero-crossing-to-impulse converter 20*b* which is identical to the zero-crossing-to-impulse converter 20*a*. The output from the zero-crossing-to-impulse converter 20*b* is fed to a narrowband filter 37 which is identical to the narrowband filter 30. The output from the narrowband filter 37 is fed to the difference circuit 38. As explained below, the signal levels from narrowband filter 30 and narrowband filter 37 are measures of the phase errors in the carriers entering the main demodulator 30 and the auxiliary demodulator 34, respectively. Therefore, the difference in these signal levels, which difference is generated by the difference circuit 38**, determines which of the two demodulators is being driven by the more optimum carrier. This difference, which can be positive or negative, drives the phase modulator in the direction that drives this difference towards zero.

After the initial pull-in of the phase offset correction, the phases of the reference carrier signals entering demodulators 10 and 34 have approximately the same absolute error but opposite directions of error. The absolute error entering each of the two devices is approximately equal to one-half of the fixed phase retardation (or advance) introduced by the phase retard device 32. By making this phase retardation small, the absolute carrier phase error driving each of the demodulators can be reduced to a small value after the initial coarse phase offset correction. This accuracy is considered sufficient from most applications.

Figure 1A:
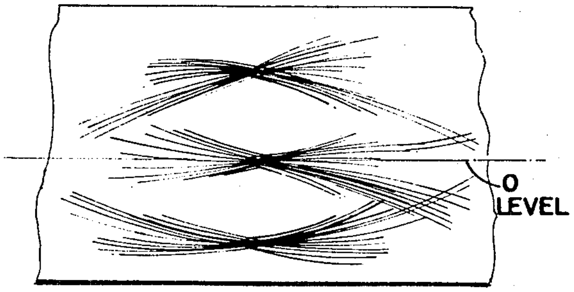
Figure 1B:
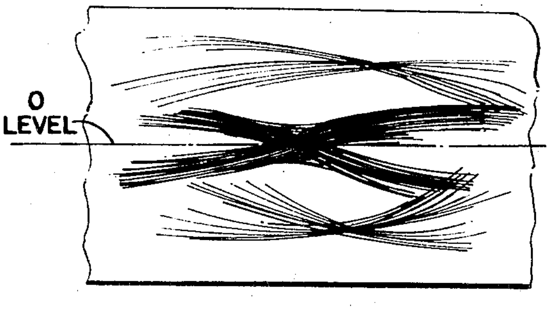

The following is an explanation of why the signal from narrowband filter 30 is a measure of the phase error in the carrier used for the main demodulator 10. The zero-crossings of the signal from lowpass filter 12 are spaced in time by almost exact integer multiples of the baud duration when the carrier phase used by the main demodulator 10 is correct. See the "eye" pattern of FIG. 1*a*. As the carrier phase error increases, the times of the zero-crossings become more dispersed about integer multiples of the baud duration, as illustrated by FIG. 1*b*. The zero-crossing-to-impulse converter **20*a* generates an impulse at each zero-crossing that is unlikely to be caused by noise. When the time spacing of the resulting impulse train from converter 20*a* becomes less dispersed from integer multiples of the baud duration, certain frequency components of this impulse train grow larger. The frequency components that grow larger have frequencies equal to integer multiples of the baud rate. The frequency component with frequency equal to twice the baud rate is especially sensitive to the dispersion of the time spacings of the zero-crossings. Therefore, we use narrowband filter 30 to extract this frequency component; and the amplitude of the output signal from narrowband filter 30 is a measure of the dispersion in time spacings of the baseband signal from lowpass filter 12 since this amplitude increases as the dispersion decreases. This dispersion in time spacings, in turn, is a measure of the error in the phase of the carrier 14 used to drive the main demodulator 10. By the same method, lowpass filter 36, zero-crossing-to-impulse converter 20*b* and narrowband filter 37 provide a measure of the phase error in the carrier used to drive the auxiliary demodulator 34**.

Figure 4:
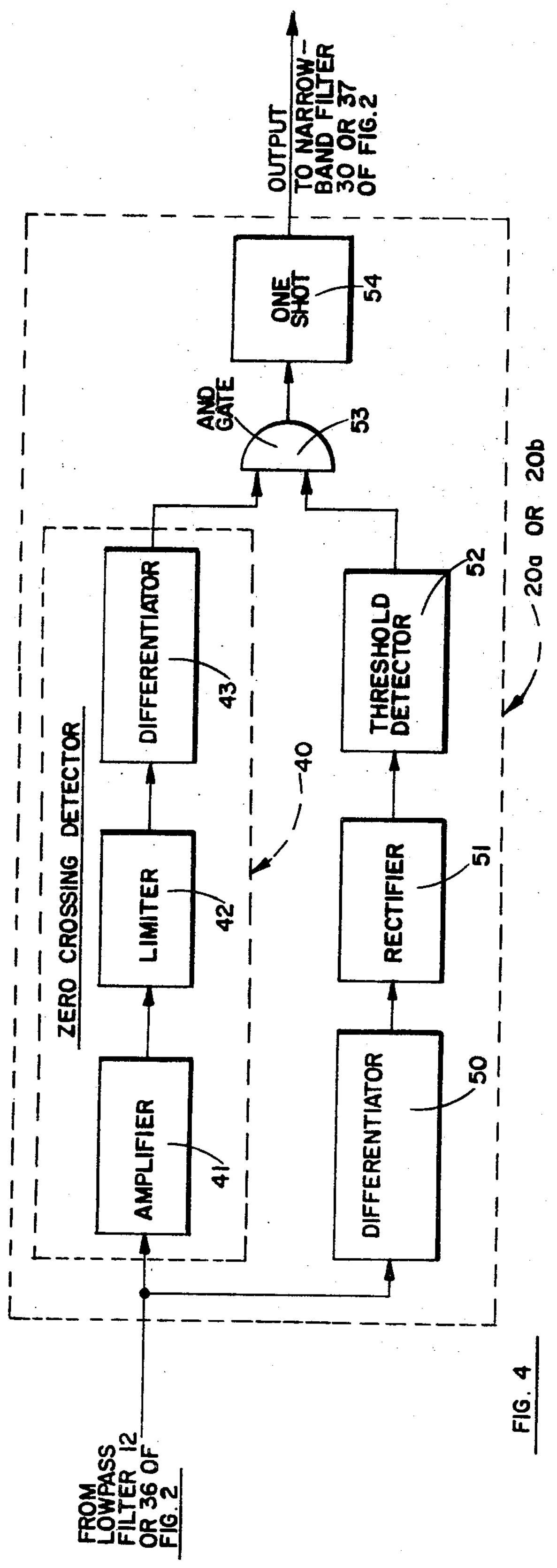
FIG. 4 is a block diagram illustrating in further detail one of the circuit blocks used in the embodiment of FIG. 1.

Referring now to FIG. 4 for a more detailed description of the zero-crossing-to-impulse converters **20*a* and 20*b*. The output signal from lowpass filter 12 or 36**, depending upon whether we are talking about the *a* or *b* channel, is fed to a zero-crossing detector 40 which crossing detector provides an output signal indicative of the occurrence of a zero-crossing of the signal from the lowpass filter. The zero-crossing detector 40 is comprised of an amplifier 41, a limiter 42, and a differentiator 43. The zero-crossing detector 40 generates a narrow pulse whenever the signal from lowpass filter 12 or 36 passes through zero. The desired zero-crossings are those where the signal level passes rapidly through zero.

Figure 5:
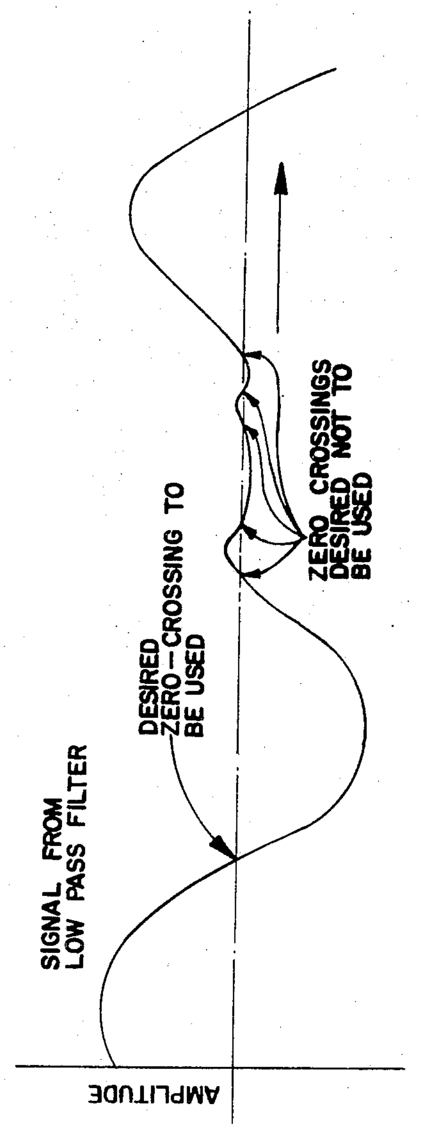
FIG. 5 is a typical waveform illustrating a received signal with desired and undesired crossings which provide a better understanding of the operation of the embodiment of FIG. 2.

FIG. 5 illustrates those zero crossings that are desired and those that are not desired. By detecting the rate of change at which a signal passes through zero, it is possible to eliminate those signals having a slow rate of change or a change which falls below a certain selected value.

Referring now to FIG. 4, the zero-crossing detector 40 is shown comprised of an amplifier 41 for amplifying the signal from the lowpass filter 12, a limiter 42 for converting the amplified signal into a square wave signal and a differentiator 43 for taking the differential of the squared signal to provide an output pulse signal at the instant of the zero-crossings of the input signal to amplifier 41. The selective rate of change is accomplished by feeding the output signal from lowpass filter 12 or 36 to differentiator 50. Differentiator 50 generates an output signal proportional to the derivative (rate of change) of the input signal. The output from differentiator 50 is then fed to a rectifier 51. The rectifier inverts the differentiator output when it is negative, so the output of the rectifier is proportional to the absolute value of the derivative of the output of lowpass filter 12 or 36. The rectified output is then fed to a threshold detector 52 which detector is set to generate an output when the rectifier output signal exceeds a certain preset threshold. The rectifier output exceeds this threshold when the signal level from lowpass filter 12 or 36 is changing rapidly in the positive or negative direction. The output from the threshold detector 52 is then fed to the AND gate 53 along with the output of the differentiator 43. The AND gate 53 generates an output pulse when it receives a signal simultaneously from both the differentiator 43 and the threshold detector 42. Thus, the AND gate generates an output pulse when the lowpass filter output signal passes rapidly through zero. The output from the AND gate is then fed to a one-shot multivibrator 54 which converts each input pulse from the AND gate to a rectangular pulse of accurately constant amplitude and width.

In the arrangement shown in FIG. 4, AND gate 53 is specifically designed to generate an output when, and only when, it receives a pulse (positive) from the threshold detector 52 simultaneously with a positive or negative pulse from differentiator 43. Possible alternatives are: (1) Insert a rectifier between differentiator 43 and AND gate 53 and use a conventional AND gate for AND gate 53; (2) eliminate rectifier 51 and design AND gate 53 to generate an output whenever it simultaneously receives two pulses of the same polarity.

As alternative to using phase modulator 31, the polarity of the phase error signal from difference circuit 38 could be used to drive an ADD/DELETE circuit or a frequency division ratio changer into a frequency divider chain that divides a stable clock frequency to provide the reference carrier 13.

While there has been shown what is considered to be the preferred embodiments of the present invention, it will be manifest that many changes and modifications may be made therein without departing from the essential spirit of the invention. It is intended, therefore, in the annexed claims, to cover all such changes and modifications as may fall within the true scope of the invention.

I claim:

1. A carrier phase offset correction system for use with a data receiver of the type that receives a data signal that has been transmitted at one or more prearranged rates wherein said correction system is comprised of:

a first and second signal channel, each comprised of a demodulator means for receiving said data signal and for demodulating said data signal against a reference carrier signal, low pass filter means for filtering said demodulated signal, means for providing an output pulse each time the filtered signal from said low pass filter means crosses through a zero amplitude level at a rate higher than a preselected rate;

a difference means for receiving the output pulses from said first and said second channel to provide an error signal indicative of the difference in carrier phase error between said first channel and said second channel;

a reference carrier phase signal source;

a phase modulator for receiving said reference carrier phase signal and for modulating the phase of said signal in response to said error signal;

a phase offset means for receiving the modulated reference carrier phase signal and for offsetting said signal by a fixed increment to provide an offset reference carrier signal which is fed to the demodulator in said second signal channel against which the input data signal is demodulated, the demodulator of said second channel receiving the offset phase modulated carrier signal as the reference signal against which the input data signal is demodulated.

2. The system according to claim 1 wherein said first and second signal channel are each further comprised of:

a narrowband filtering means for converting the output pulse train from said zero-crossing-to-impulse converter means into a signal level indicative of the phase error in said reference carrier signal.

3. A carrier phase offset correction system for use with a data receiver of the type that receives a data signal that has been transmitted at one or more prearranged baud rates wherein said correction system is comprised of:

first and second demodulating means for demodulating said received data signal against a reference signal, the output of said correction system being taken from said first demodulator means;

first and second zero-crossing detector means for receiving the demodulated baseband signal from said first and second demodulator means, respectively, and for providing output signals indicative of the zero-crossings of said demodulated baseband signal;

rate means for limiting the provided output signals from said zero-crossing detector means to crossing signals having a rate of crossing greater than a preselected value;

difference means for receiving the non-limited crossing signal from said first and said second zero-crossing detector means and for providing an error signal proportional to the difference between said output signals;

a reference carrier signal source providing a carrier signal;

a phase modulator receiving said provided carrier signal and modulating the phase of said carrier signal by an amount proportional to said error signal, said phase modulated carrier signal being fed to said first demodulating means as said reference signal; and phase offset means for receiving as an input said modulated reference carrier phase signal and for offsetting the phase of said modulated reference carrier signal by a fixed amount, said offset signal fed to said second demodulator as said reference signal.

4. The system according to claim 3 and further comprising:

a narrowband filtering means for receiving the output signal from said rate means and for converting said output signals into signal levels indicative of the phase error in said reference carrier, said signal levels being fed to said difference means.

5. A carrier phase offset correction system for use with a data receiver of the type that receives a data signal that has been transmitted at one or more prearranged baud rates wherein said correction system is comprised of:

first and second demodulating means for demodulating said received data signal against a reference signal, the output of said correction system being taken from said first demodulator means;

a first and second zero-crossing detector for providing an output signal indicating the zero-crossing of the demodulated signals from said first and said second demodulating means, respectively;

a first and second rate detector having as an input the demodulated signals from said first and said second demodulators, respectively, and providing an output signal when said demodulated signal passes through a zero reference at a rate greater than a preselected value;

a first and second gate means receiving the output signals from said first and second zero-crossing detectors, respectively, and from said first and second rate detectors, respectively, and providing an output upon the simultaneous receipt of an output signal from said rate detector and said zero-crossing detector;

difference means for receiving the output signal from said first and said second gate means and for providing an error signal proportional to the difference between said output signals;

a reference carrier signal source providing a carrier signal;

a phase modulator receiving said provided carrier signal for modulating the phase of said carrier signal by an amount proportional to said error signal, said phase modulated carrier signal being fed to said first demodulating means as said reference signal; and phase offset means for receiving as an input said modulated reference carrier phase signal, for offsetting the phase of said modulated reference carrier signal by a fixed amount, said offset signal fed to said second demodulator as said reference signal.

6. The carrier phase offset correction system of claim 5 wherein said first and second rate detectors are each comprised of:

a differentiator for receiving said demodulated signal and for providing a signal proportional to the differential of said demodulated signal;

a rectifier for rectifying said differential signal; and a threshold detector for providing an output signal when the amplitude of said rectified differential signal is above a preselected amplitude.

7. A carrier phase correction system according to claim 5 wherein said first and said second zero-crossing detectors are each comprised of:

an amplifier for amplifying said demodulated signal;

a limiter for converting said amplified signal into a square wave signal; and a differentiator for converting said square wave signal into output pulse signals corresponding to the zero-crossings of said demodulated signals.

8. The carrier phase offset correction system according to claim 5 and further comprising:

a first and second narrowband filter means receiving the outputs from said first and second gate means, respectively, and for converting said output signals into signal levels indicative of the phase error in said reference carrier, said signal levels being fed to said difference means.

* * * * *